United States Patent [19]

Kujala

[11] Patent Number: 5,074,525
[45] Date of Patent: Dec. 24, 1991

[54] HYGIENIC STOP VALVE

[75] Inventor: Hannu Kujala, Helsinki, Finland

[73] Assignee: Koltek Oy, Vantaa, Finland

[21] Appl. No.: 612,191

[22] Filed: Nov. 13, 1990

[51] Int. Cl.$^5$ .............................................. F16K 25/00
[52] U.S. Cl. .................................. 251/188; 251/161; 251/162; 251/900
[58] Field of Search ............... 251/188, 900, 161, 192, 251/162

[56] References Cited

U.S. PATENT DOCUMENTS

| 2,072,965 | 3/1937 | Robinson et al. | 251/188 |
| 2,417,494 | 3/1947 | Hoof | 251/900 |
| 3,342,453 | 9/1967 | Soila et al. | 251/188 |

Primary Examiner—A. Michael Chambers
Attorney, Agent, or Firm—Jones, Askew & Lunsford

[57] ABSTRACT

A stop valve is disclosed which includes a means for venting fluid to the exterior of the valve housing if the valve is not properly adjusted, thereby providing a readily detectable visual indication that the valve needs to be readjusted or retightened. In another aspect, the invention includes a hygienic shutter assembly which seals the juncture between the shutter and its associated backing plate in a manner which eliminates crevices and sharp angles within which dirt and debris can accumulate.

3 Claims, 5 Drawing Sheets

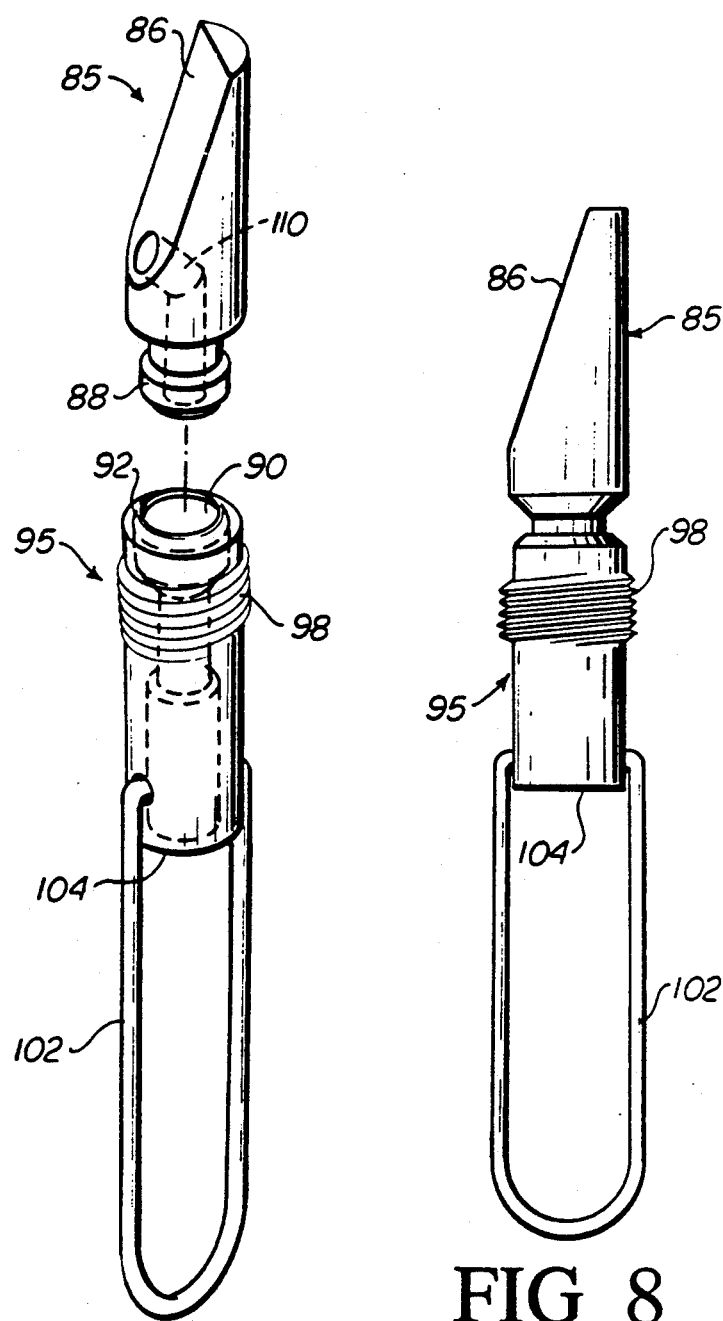

HYGIENIC STOP VALVE

TECHNICAL FIELD

The present invention relates generally to a stop valve, and relates more specifically to a stop valve of hygienic construction suitable for use in transporting liquids such as milk and the like.

BACKGROUND OF THE INVENTION

Stop valves for use in shutting off the flow of fluid through a pipe or diverting a fluid flow from a first pipe to a second pipe are well known. An example is disclosed in U.S. Pat. No. 3,342,453 to Soila et al., which patent is hereby incorporated by reference. The Soila patent discloses a stop valve comprising a valve body defining a mainly cylindrical valve cavity having two or more through passages. A shutter disposed within the valve cavity can be rotated to seal the through passage openings by means of a rotatable turning spindle accessible from the exterior of the valve housing. The shutter is tightened by means of a wedge plug bearing against a corresponding inclined plane on the shutter assembly; as the wedge plug is advanced into the turning spindle, the stopping member is wedged against the corresponding valve seat. The arrangement described in the Soila patent is suitable for use in either two-way or three-way valves.

Problems arise, however, when attempting to use a valve of the type described in the Soila patent in hygienic environments. For example, such valves are frequently needed in dairy processing plants, either as shutoff valves for milk storage tanks or as diverter valves, for diverting the output from a milk storage tank to either of two processing lines or for selecting from between two storage tanks for output to a single processing line. If the valve is not properly seated, milk can leak past the stopping member and settle in the pipe downline of the valve. Since the lines are not refrigerated, the leaked milk can spoil and contaminate the next milk which flows through the line. In addition, if the valve is not properly seated, non-potable CIP ("clean-in-place") solution used to clean lines can leak into the tank and contaminate the milk in the storage tank. However, since it is difficult, if not impossible, to verify that valves of the type disclosed in the aforementioned Soila patent are properly seated by visually inspecting the valve, it is not easy to detect leaks of the type described. Thus, there is a need for a stop valve of the type disclosed in the aforementioned Soila patent which permits easy visual verification that the valve is properly seated.

A further hygienic problem is presented by the construction of the shutter or stopping element of the valve disclosed in the aforementioned U.S. Pat. No. 3,342,453 to Soila et al. Where such valves are to be used in hygienic environments such as the dairy processing plants to which previous reference has been made, sanitary standards require that there be a smooth, radiused edge in all corners and that abrupt transitions be avoided. Further, crevices and cracks must be strictly avoided to prevent debris and germs from gathering in such locations. However, the construction disclosed in the Soila patent does comprise crevices which milk can penetrate. For example, the stopping element is comprised of a plastic packing ring mounted to a metal fastening plate. The plastic ring and metal fastening plate intersect at a sharp right angle, providing a corner within which debris and germs can gather. The construction disclosed in the Soila patent therefore would not be ideal for such hygienic applications. Thus, there is a need for a stop valve of the general type disclosed in the aforementioned Soila patent which eliminates the sharp right angle corner at the intersection between the shutter and its corresponding carrier member.

SUMMARY OF THE INVENTION

As will be seen, the present invention overcomes these and other problems associated with prior art stop valves. Stated generally, the present invention comprises a stop valve which provides an easy means for visually verifying that the valve is properly seated. The valve includes an arrangement whereby fluid is vented to the outside of the valve housing if the valve is not properly adjusted. Thus, the absence of fluid leaking from the housing provides an easy visual verification that the valve is properly adjusted. In another aspect, the present invention comprises a stop valve which is especially suited for use in hygienic applications. The shutter assembly of the valve comprises a gasket arrangement which seals the juncture between the valve shutter and the shutter seat in such a manner as to avoid sharp angles and crevices within which dirt and debris can accumulate.

Stated somewhat more specifically, in a first aspect of the present invention a stop valve comprises a valve housing defining an essentially cylindrical valve chamber with at least two through passages. A spindle is mounted within the cylindrical chamber for rotational movement about the central axis of the chamber. The spindle includes an axial bore and a communicating radial bore. A shutter is disposed within the cylindrical chamber for radial movement with respect to the central axis of the chamber so as to be selectively operative to close a selected one of the through passages. The shutter has a bearing portion which is received through the radial bore of the spindle and into the axial bore thereof.

A wedge member is mounted within the axial bore of the spindle for axial movement therewithin. The wedge member has a wedge surface formed thereon operative to engage the bearing portion of the shutter to displace the shutter radially outwardly and into contact with the wall of the valve housing. The wedge member includes a port formed through the wedge member and venting to the exterior of the valve housing. A gasket is normally operative to permit fluid to flow through the radial bore of the spindle. However, when the shutter is operated to close a selected one of the through passages, the gasket is operative to seal the radial bore of the spindle to prevent fluid from reaching the port in the wedge member and being vented to the exterior of the valve housing. Thus, when the shutter is not properly tightened, fluid will enter the port and thereby be vented to the exterior of the valve housing to provide a visual indication that said shutter is not properly tightened.

In another aspect of the invention, a hygienic shutter assembly is disclosed for use with a valve housing defining an essentially cylindrical chamber. The shutter assembly includes a shutter having a curved outer surface and a flat inner surface. The shutter assembly further includes a shutter seat for carrying the shutter, the shutter seat including an outwardly directed backing plate for engaging the flat inner surface of the shutter. A first gasket recess is formed on the periphery of the backing plate, and a second gasket recess is formed in the flat inner surface of the shutter and cooperatively aligned with the first gasket recess. A gasket engages the first and second gasket recesses and extends exteriorly of the backing plate to seal the juncture between the inner surface of the shutter and the backing plate. The gasket thus not only seals the juncture between the inner surface of the shutter and the periphery of the backing plate but also eliminates crevices and sharp angles which can accumulate dirt and debris. The shutter is therefore suitable for use in hygienic environments, such as dairy processing plants and the like.

Thus, it is an object of the present invention to provide an improved stop valve.

It is a further object of the present invention to provide a stop valve which permits easy visual verification that the valve is properly seated.

Another object of the present invention is to provide a stop valve which is suitable for use in hygienic environments such as dairy processing plants and the like.

It is yet another object of the present invention to provide a stop valve which eliminates sharp angles and crevices between the shutter and its corresponding carrier member which can collect dirt and debris.

Other objects, features, and advantages of the present invention will become apparent upon reading the following specification, when taken in conjunction with the drawings and the appended claims.

BRIEF DESCRIPTION OF THE DRAWINGS

FIG. 7 is an exploded perspective view of a tightening wedge and tightening screw of the stop valve of FIG. 1.

FIG. 8 is a perspective view showing the tightening wedge and tightening screw of FIG. 7 assembled.

DETAILED DESCRIPTION OF THE DISCLOSED EMBODIMENT

Figure 1:
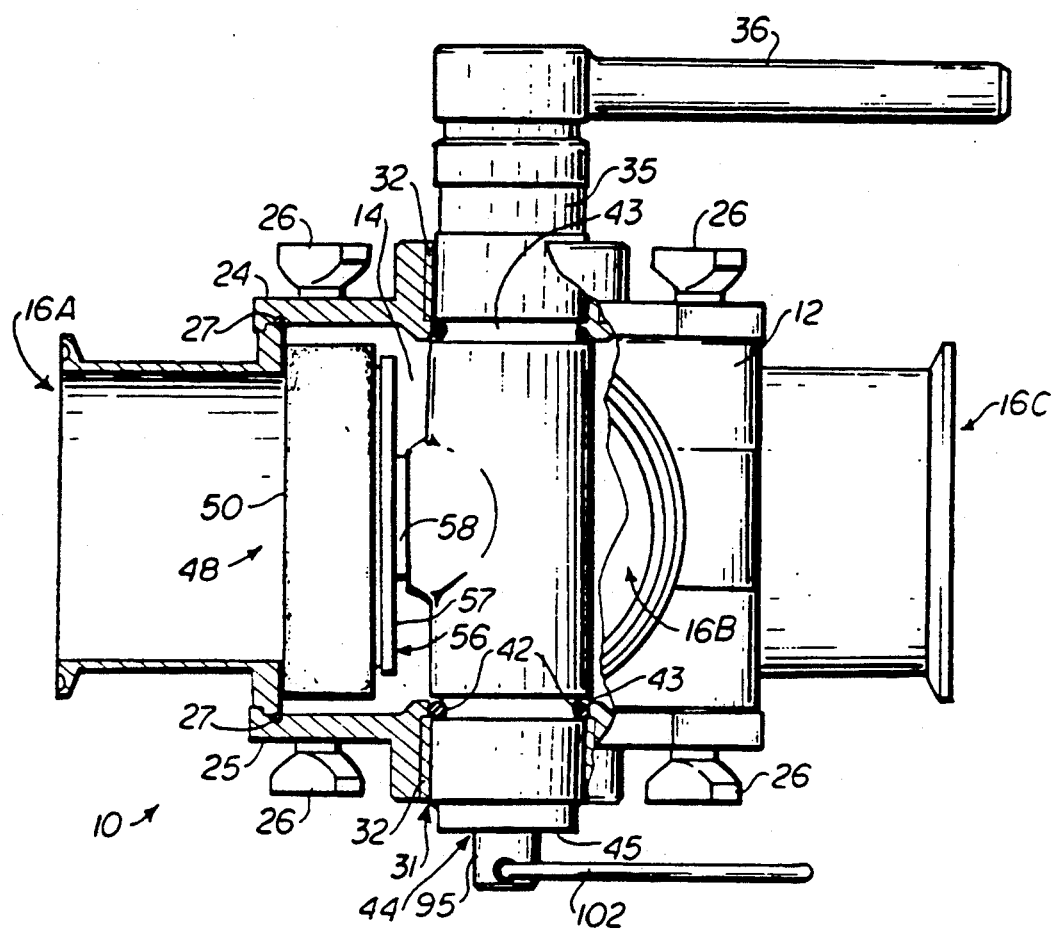
FIG. 1 is a side cutaway view of a stop valve according to the present invention.
Figure 2:
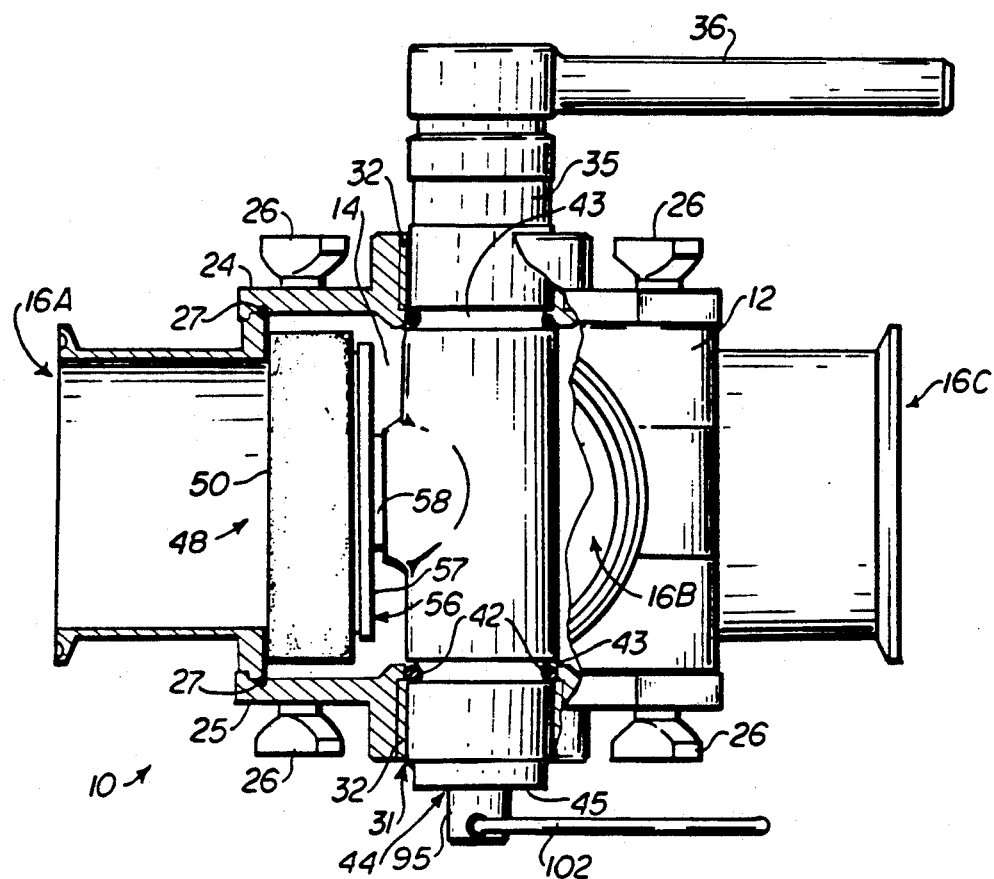
FIG. 2 is a further side cutaway view of the stop valve of FIG. 1 with the turning spindle cut away to reveal additional detail.

Referring now in more detail to the drawings, in which like numerals indicate like elements throughout the several views, FIGS. 1 and 2 disclose a three-way stop valve 10. The stop valve 10 comprises a valve body or housing 12 having a generally cylindrical valve chamber 14 and three through passages 16A, 16B, and 16C. The valve body 12 comprises three clamp-type connector portions 20, each of which comprises a radially extending flange 22 at the end of the connector portion. It will be understood that the type of connector is not critical to the invention, and that threaded end connectors or other suitable connection means may be employed instead of the clamp-type connector portions disclosed.

The valve body 12 is closed at its upper end by an upper end cap 24 and at its lower end by a lower end cap 25. The upper and lower end caps 24, 25 are secured to the valve body 12 by means of thumb screws 26 to permit easy assembly and disassembly of the valve for cleaning. An O-ring seal 27 fits within a corresponding groove on the interior surface of each of the upper and lower caps 24, 25 to provide a leakproof seal between the valve body 12 and the end caps. A first cylindrical bore 30 is formed through the upper end cap 24, and a second cylindrical bore 31 is formed through the lower end cap 25. The bores 30, 31 are located such that when the upper and lower end caps 24, 25 are assembled onto the valve body 12, the bores are coaxial with the cylindrical valve chamber 14. A bushing 32 is disposed within each of the cylindrical bores 30, 31 in the upper and lower end caps 24, 25.

Figure 4:
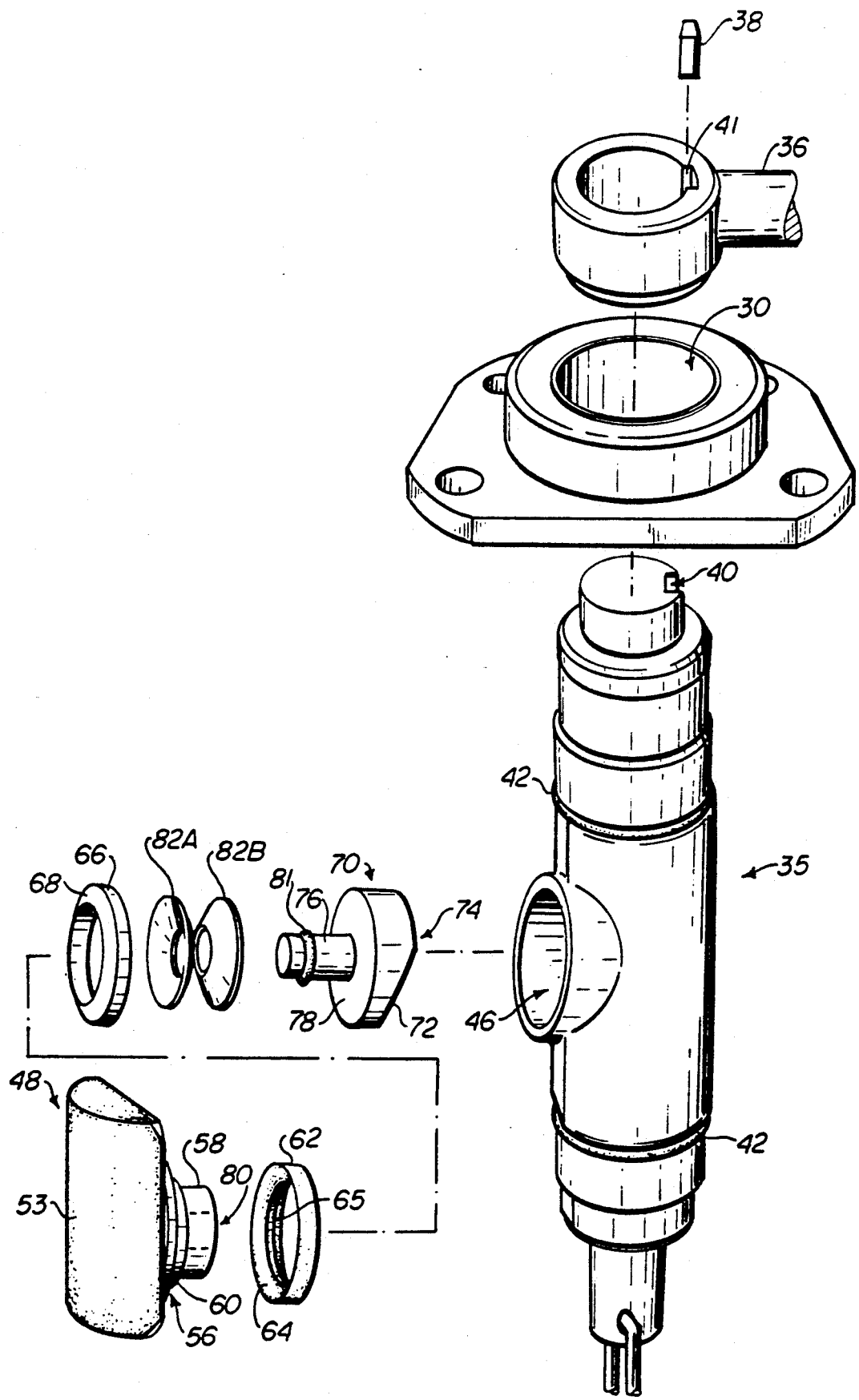
FIG. 4 is an exploded perspective view of a valve shutter assembly and turning spindle of the stop valve depicted in FIG. 1.
Figure 5:
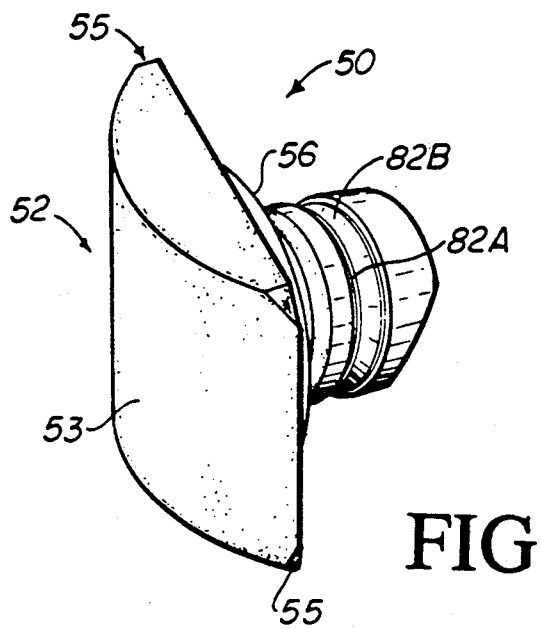
FIG. 5 is a perspective view of the shutter of the stop valve of FIG. 1.

A turning spindle 35 is received through the bores 30, 31 in the upper and lower end caps 24, 25 for coaxial rotational movement within the cylindrical valve chamber 14. The turning spindle 35 has a radially extending lever 36 at its upper end by which the turning spindle may be rotated. As can be seen in FIG. 4, the lever 36 is rotationally fixed with respect to the turning spindle 35 by means of a key 38 which engages corresponding keyways 40, 41 in the turning spindle and handle respectively. Upper and lower O-ring seals 42 are disposed within annular recesses 43 at upper and lower portions of the turning spindle to form a tight seal between the turning spindle and the bushings 32 in the upper and lower end caps 24, 25.

Figure 3:
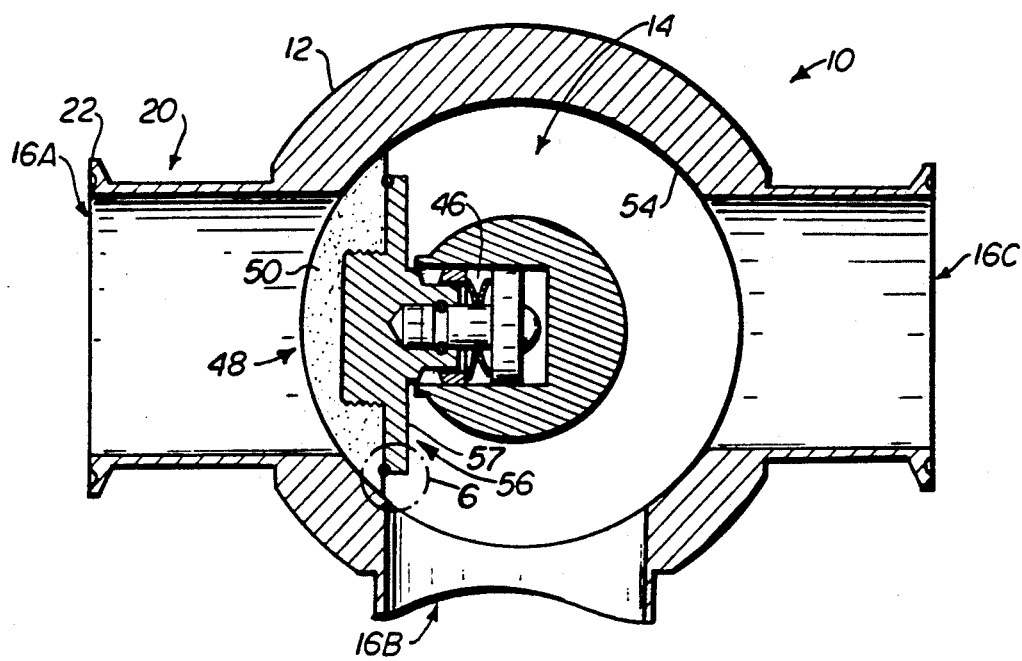
FIG. 3 is a cutaway view taken along section line 3—3 of FIG. 2.

Referring again to FIG. 1, the turning spindle 35 comprises an axial bore 44 extending upwardly through the lower end 45 of the turning spindle. A transverse or radial bore 46 is formed through an intermediate portion of the turning spindle and communicates with the axial bore 44. Within the cylindrical valve chamber 14 is arranged a shutter assembly 48. The shutter assembly 48 includes a shutter 50 comprised of Teflon ® or other suitable material. The shutter includes a substantially planar inner surface 52 and a generally semi-cylindrical outer surface 53 configured to conform to the walls 54 defining the cylindrical valve chamber 14. The corners 55 of the shutter 50 are bevelled to prevent the shutter from "hanging" as the valve is adjusted. A shutter seat 56 is mounted to the back of the shutter 50. The shutter seat 56 includes a backing plate 57 formed at its outer portion. The shutter seat 56 further includes a plug 58 which extends radially inwardly from the backing plate 57 into the radial bore 46 of the turning spindle 35. As can be seen in FIG. 3, the portion of shutter seat 56 adjacent the plug 58 comprises a convex annular wall 60. A deformable washer 62 comprised of Teflon or other suitable material fits onto the plug 58. The deformable washer 62 has a concave outer face 64 corresponding to the convex wall portion 60 at the end of the plug 58. The opposing inner face 65 of the deformable washer 62 is similarly concave such that the washer is substantially V-shaped in cross section. A metal washer 66 comprised of stainless steel or other suitable material fits onto the plug 58 and has a convex outer surface 68 which corresponds to the concave inner face 65 of the deformable washer 62. When viewed in cross section, the convex wall portion 60 of the shutter seat 56 and the mutually facing outer convex surface 68 of the metal washer 66 form a V-shaped groove within which the V-shaped deformable washer 62 is received.

A wedging member 70 has an inclined bearing surface 72 formed on its inner surface 74. The wedging member 70 further has a stem 76 projecting outwardly from its outer surface 78. The stem 76 engages a bore 80 formed within the plug 58 of the shutter seat 56 such that the wedging member 70 is radially movable with respect to the shutter seat. An O-ring 81 fits in an annular raceway on the stem 76 of the wedge member 70 to provide a tight fit between the stem and the bore 80 in the plug 58 of the shutter seat 56. Mutually opposing pairs of cup spring members 82A, 82B are disposed coaxially around the stem 76 of the wedge member 70. The end of one pair of cup springs 82A bears against the metal washer 66, and the end of the other pair of cup springs 82B bears against the outer surface 78 of the wedge member 70.

Figure 6:
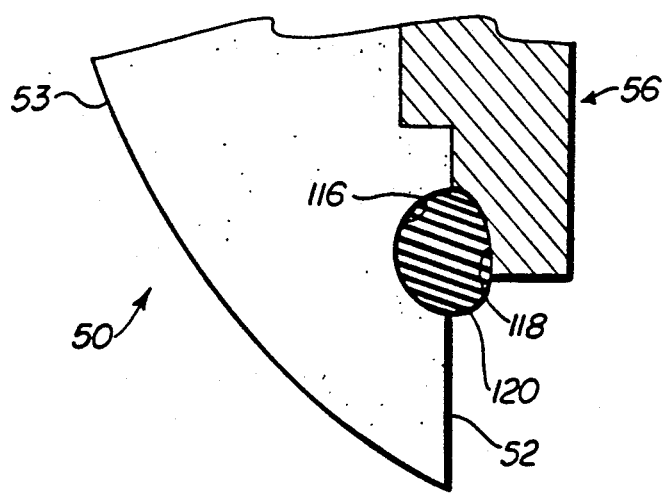
FIG. 6 is an enlarged isolated section view of the O-ring structure identified by the circle 6 in FIG. 4.

Disposed within the axial bore 44 of the turning spindle 35 is a tightening wedge 85. The tightening wedge 85 has an inclined face 86 formed at its upper end. As can be seen in FIG. 6, the lower end 88 of the tightening wedge 85 is somewhat ball-shaped and fits within a conforming socket 90 in the upper end 92 of a tightening screw 95. The somewhat ball-shaped lower end 88 of the tightening wedge 85 operatively engages the conforming socket 90 in the upper end of the tightening screw 95 in such a manner as to provide a limited range of arcuate movement of the tightening wedge 85 with respect to the tightening screw 95. In addition, the lower end 88 of the tightening wedge 85 is free to rotate within the socket 90 in the upper end of the tightening screw 95.

The tightening screw 95 comprises external threads 98 which engage a correspondingly threaded section at the lower end of the axial bore 44 in the turning spindle 35. A handle 102 is provided adjacent the lower end 104 of the tightening screw 95 to provide a convenient means for turning the tightening screw. The operative engagement between the tightening wedge 85 and the tightening screw 95 is such that the tightening screw 95 can be turned to advance the screw into the axial bore 44 of the turning spindle 35, and tightening wedge 85 will be thereby advanced but will not rotate.

A port 110 is formed in the lower portion of the inclined face 86 of the tightening wedge 85. The port 110 extends through the tightening wedge 85 and out the lower end 88 thereof. The tightening screw 95 is essentially hollow. Thus, a fluid entering the upper end of the port 110 at the inclined face 86 of the tightening wedge 85 flows freely under force of gravity through the port, out the lower end 88 of the tightening wedge, through the hollow tightening screw 95, and out the lower end 104 thereof.

FIG. 6 shows an arrangement for sealing a juncture between the planar inner surface 52 of the shutter 50 and the backing plate 57 of the shutter seat 56. A semicircular first gasket recess 116 is formed in the inner surface 52 of the shutter 50. A second cooperatively aligned gasket recess 118 having a shape in cross section of approximately a quarter circle is formed around the periphery of the shutter seat backing plate 57. An O-ring 120 is captured within the cooperatively aligned gasket recesses 116, 118 in such a manner as to provide a smooth transition between the planar inner surface 52 of the shutter 50 and the backing plate 57 of the shutter seat 56.

Adjustment of the shutter tension will now be explained. Adjustment of the shutter tension is required not only during the initial assembly of the valve 10 but also any time the valve is disassembled, such as for inspection in the field. To adjust the shutter tension, the handle 102 at the lower end 104 of the tightening screw 95 is rotated to advance the tightening screw 85 into the axial bore 44 of the turning spindle 35. As the tightening screw 95 is advanced, the tightening wedge 85 is displaced upwardly, and the inclined face 86 at the upper end of the tightening wedge impinges upon the inclined bearing surface 72 on the wedging member 70. The axially upward force on the tightening wedge 85 is thereby translated to a radially outward force on the wedging member 70 which displaces the shutter 50 radially outwardly and into engagement with the valve housing walls immediately surrounding the respective through passage 16A.

As the tension on the valve shutter 50 is increased, the deformable washer 62 on the plug of the shutter assembly 48 is compressed between the shutter seat 56 and the opposed metal washer 66. The bevelled surface 60 of the shutter seat 56 and the bevelled surface 68 of the metal washer 66 cause the deformable washer 62 to be deformed outwardly, forcing the outer surface of the deformable washer 62 into snug engagement with the walls of the radial bore 46. Thus, proper tightening of the valve 10 seals off the radial bore 46.

The operation of the valve 10 will now be explained. To shut off a particular one of the through passages 16A, 16B, 16C, the lever 36 at the upper end of the turning spindle 35 is simply rotated to align the shutter 50 with the desired through passage, for example, 16A. In the event that the shutter assembly 48 is not properly adjusted, the deformable washer 62 will not be compressed into snug engagement with the walls defining the radial bore 46 in the turning spindle 35. As a consequence, fluid will flow around the washers 62, 66 and flood the radial and axial bores 44, 46 of the turning spindle 35. The fluid will then enter the port 110 at the lower end of the inclined face 86 on the tightening wedge 85 and thereby flow freely under force of gravity through the port, out the lower end 88 of the tightening wedge, through the hollow tightening screw 95, and out the lower end 104 thereof. The presence of fluid leaking out of the lower end of the valve 10 provides a clear and immediate visual indication that the valve is not properly seated, thereby alerting the user of the need to adjust the tension of the valve shutter.

To operate the valve 10 to close off another one of the through passages 16A, 16B, 16C, the lever 36 at the upper end of the turning spindle 35 is simply turned to align the shutter 50 with another desired through passage. If the shutter tension was previously properly adjusted, there should be no need to adjust the tension on the shutter when the valve is opened or closed. However, if at any time fluid is detected leaking out of the housing, the operator will know that readjustment of the shutter tension is required.

Another feature of the disclosed stop valve concerns the arrangement for sealing the juncture between the inner surface 52 of the shutter 50 and the backing plate 57 of the shutter seat 56. As will appreciated by those skilled in the art, a conventional O-ring gasket arrangement typically includes a groove formed in one component within which the O-ring fits. The O-ring is then imposed against the surface of the second component. In the case of a plastic component and a metal component, the groove is conventionally formed in the metal component. The conventional arrangement thus presents a crevice between the two members and around the O-ring within which dirt and debris can accumulate. The shutter assembly 48 of the present invention overcomes this problem by providing gasket recesses in both the inner surface 52 of the shutter 50 and the mutually facing surface of the backing plate 57 of the shutter seat 56 and by locating the second gasket recess 118 at the periphery of the shutter seat backing plate 57. The O-ring 120 is captured within the cooperatively aligned gasket recesses 116, 118 in such a manner as to provide a smooth transition between the periphery of the shutter seat backing plate 56 and the inner surface 52 of the shutter 50. The O-ring 120 thus not only seals the juncture between the shutter 50 and the backing plate 57 but also eliminates crevices and sharp angles which can accumulate dirt and debris. This makes the valve 10, and in particular the shutter assembly 48, especially well suited for use in hygienic environments such as dairy processing plants and the like.

The present invention has been disclosed with respect to a valve having three through passages. In such an arrangement, the valve may be set either to stop the flow of fluid through the valve completely or to divert the flow of fluid through a selected through passage. However, it will be understood that the invention is not limited to a valve having three through passages, and that the principles of the present invention are equally applicable to a valve having only two through passages. In this latter arrangement, the valve may be either closed to stop the flow of fluid through the valve or opened to permit the flow of fluid through the valve.

Finally, it will be understood that the preferred embodiment has been disclosed by way of example, and that other modifications may occur to those skilled in the art without departing from the scope and spirit of the appended claims.

What is claimed is:

1. A stop valve comprising:
   a valve housing defining an essentially cylindrical chamber and having at least two through passages, said cylindrical chamber defining a central axis;
   a spindle mounted within said cylindrical chamber for rotational movement about said central axis of said cylindrical chamber, said spindle defining an axial bore and a communicating radial bore;
   a shutter disposed within said cylindrical chamber for radial movement with respect to said central axis of said cylindrical chamber so as to be selectively operative to close a selected one of said through passages, said shutter having a bearing portion formed thereon, said bearing portion being received through said radial bore of said spindle and into said axial bore thereof;
   a wedge member mounted within said axial bore of said spindle for axial movement therewithin, said wedge member having a wedge surface formed thereon operative to engage said bearing portion of said shutter to displace said shutter radially outwardly;
   means defining a port through said wedge member and to the exterior of said valve housing; and
   gasket means normally operative to permit fluid to flow through said radial bore of said spindle, said gasket means upon said shutter being operated to close a selected one of said through passages being operative to seal said radial bore of said spindle to prevent fluid from reaching said port means in said wedge member;
   whereby when said shutter is not properly tightened to close a selected one of said through passages, fluid from said any of said through passages will enter said port and thereby be vented to the exterior of said valve housing to provide a visual indication that said shutter is not properly tightened.

2. The stop valve of claim 1, wherein said bearing portion of said shutter is radially movable with respect to said shutter, and wherein said gasket means comprises a deformable washer captured between said bearing portion and said shutter within said radial bore of said spindle, said washer being normally operative to permit fluid to flow through said radial bore, and when said shutter is operated to close a selected one of said through passages, said washer is compressed between said bearing portion and said shutter and deforms outwardly to contact the walls defining said radial bore to seal said bore and to prevent fluid from flowing therethrough.

3. The stop valve of claim 1, wherein said deformable washer comprises opposing concave surfaces, wherein said shutter has a convex portion engaging one of said concave surfaces of said deformable washer, and wherein said bearing portion has a convex portion engaging the other of said concave surfaces of said deformable washer, said convex portions of said shutter and said bearing portion facilitating an outward deformation of said deformable washer to promote contact between the deformable washer and the walls defining said radial bore.

* * * * *